(12) United States Patent
Pan et al.

(10) Patent No.: US 12,397,431 B2
(45) Date of Patent: Aug. 26, 2025

(54) ROBOT TRAJECTORY UNDER COLLISION CONSTRAINTS

(71) Applicant: Tencent America LLC, Palo Alto, CA (US)

(72) Inventors: Zherong Pan, Bellevue, WA (US); Xifeng Gao, Bellevue, WA (US); Kui Wu, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 212 days.

(21) Appl. No.: 18/097,753

(22) Filed: Jan. 17, 2023

(65) Prior Publication Data

US 2024/0238977 A1 Jul. 18, 2024

(51) Int. Cl.
*B25J 9/16* (2006.01)

(52) U.S. Cl.
CPC .......... *B25J 9/1676* (2013.01); *B25J 9/1666* (2013.01)

(58) Field of Classification Search
CPC .............................. B25J 9/1676; B25J 9/1666
See application file for complete search history.

(56) References Cited

U.S. PATENT DOCUMENTS

| | | | |
|---|---|---|---|
| 12,025,970 B2 * | 7/2024 | Cheon | G05D 1/0212 |
| 2016/0271796 A1 * | 9/2016 | Babu | B25J 9/1664 |
| 2018/0173242 A1 | 6/2018 | Lalonde et al. | |
| 2020/0004260 A1 * | 1/2020 | Kim | G05D 1/0221 |
| 2020/0070347 A1 * | 3/2020 | Denenberg | B25J 9/1653 |
| 2020/0174483 A1 | 6/2020 | Cheon et al. | |
| 2021/0252707 A1 * | 8/2021 | Wang | B25J 9/1666 |
| 2021/0271269 A1 * | 9/2021 | Huang | G08G 5/0069 |
| 2021/0334630 A1 * | 10/2021 | Lambert | G06N 3/047 |
| 2022/0088787 A1 | 3/2022 | Vu et al. | |
| 2022/0234209 A1 * | 7/2022 | Kriveshko | B25J 9/1697 |
| 2022/0379478 A1 * | 12/2022 | Raghunathan | B25J 9/1676 |

(Continued)

OTHER PUBLICATIONS

International Search Report with Written Opinion for PCT/US2023/074350, issued Jan. 24, 2024, 19 pages.

(Continued)

*Primary Examiner* — Sze-Hon Kong
(74) *Attorney, Agent, or Firm* — ArentFox Schiff LLP

(57) ABSTRACT

Processing circuitry selects surrogate time instances respectively representing temporal subsets of a time duration of a first intermediate trajectory for a robot. The processing circuitry determines surrogate constraints respectively associated the surrogate time instances, the surrogate constraints require a distance between the robot and an obstacle to satisfy a safe distance requirement at the surrogate time instances. The processing circuitry determines an adjustment from the first intermediate trajectory to a second intermediate trajectory based on the surrogate constraints. The processing circuitry determines a first strict surrogate constraint for a first surrogate time instance representing a first temporal subset based on the first temporal subset, the first strict surrogate constraint ensures the safe distance requirement being satisfied in the first temporal subset in response to the first strict surrogate constraint being satisfied. The processing circuitry performs a safety check of the second intermediate trajectory according to the first strict surrogate constraint.

18 Claims, 11 Drawing Sheets

(56) References Cited

U.S. PATENT DOCUMENTS

2023/0099683 A1* 3/2023 Oyama ................. B25J 9/1661
  700/250
2023/0288886 A1* 9/2023 Berntorp .............. G05B 13/042
2023/0384762 A1* 11/2023 Vinod ................ G05B 19/4155

OTHER PUBLICATIONS

Castro, Trajectory Planning for Robot Manipulators., Nov. 6, 2019, pp. 1 to 12.
Papadopoulos et al., Analysis of Asymptotically Optimal Sampling-based Motion Planning Algorithms for Lipschitz Continuous Dynamical Systems, May 12, 2014 pp. 1 to 21.
Younes et al., Nonlinear Model Predictive Horizon for Optimal Trajectory Generation, Jul. 14, 2021, pp. 1-23.
Li et al., A Mobile Robot Path Planning Algorithm Based on Improved A* Algorithm and Dynamic Window Approach, Jun. 6, 2022, pp. 1 to 12.
Lu et al., Motion Planning for Collision-resilient Mobile Robots in Obstacle-cluttered Unknown Environments with Risk Reward Trade-offs, Sep. 4, 2020, pp. 1 to 7.

* cited by examiner

Algorithm 2: Safety-Check ($\theta$)

Output: $\langle i, j, k, l \rangle$ such that $P_{ijkl}$ violates safety condition 1: for Each penalty term $P_{ijkl}$ do
2:    if $\text{dist}\left(b_{ij}\left(\frac{T_0^l + T_1^l}{2}, \theta\right), o_k\right) \leq d_0 + L_1(T_1^l - T_0^l)/2$ then
3:       Return $\langle i, j, k, l \rangle$
4: Return None

*FIG. 5*

Algorithm 3: Line-Search($\theta, d, \epsilon_\alpha$)

Input: Initial $\alpha_0$, $\gamma \in (0, 1)$

Output: Step size $\alpha$ and updated $\epsilon_\alpha$

1: $\alpha \leftarrow \alpha_0$
2: $\theta' \leftarrow \theta + d\alpha$
3: $\langle i, j, k, l \rangle \leftarrow$ Safe-Check$(\theta')$
4: while $\langle i, j, k, l \rangle \neq$ None $\vee$ $\theta'$ violates Eq. (14) do
5:    if $\langle i, j, k, l \rangle \neq$ None then
6:       if $\alpha \leq \epsilon_\alpha$ then
7:          $\epsilon_\alpha \leftarrow \gamma \epsilon_\alpha$
8:          Subdivide$(P_{ijkl})$ and re-evaluate $\mathcal{E}(\theta)$
9:          $d \leftarrow d^{(1)}$ or $d \leftarrow d^{(2)}$
10:      else
11:         $\alpha \leftarrow \gamma \alpha$
12:    else
13:       $\alpha \leftarrow \gamma \alpha$
14:    $\theta' \leftarrow \theta + d\alpha$
15:    $\langle i, j, k, l \rangle \leftarrow$ Safe-Check$(\theta')$
16: Return $\alpha, \epsilon_\alpha$

FIG. 6

ROBOT TRAJECTORY UNDER COLLISION CONSTRAINTS

TECHNICAL FIELD

The present disclosure describes embodiments generally related to robotic technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In some robotic applications, trajectory generation for articulated robots is used to plan robotic motions. The trajectory generation can be performed under various requirements. In some examples, a collision-free guarantee is one of the requirements. The collision-free guarantee requires a robot body to be bounded away from static and dynamic obstacles by a safe distance.

SUMMARY

Aspects of the disclosure provide methods and apparatuses for generating a trajectory of a robot. In some examples, an apparatus for generating a trajectory of a robot includes processing circuitry. The processing circuitry selects a plurality of surrogate time instances respectively representing a plurality of temporal subsets of a time duration of a first intermediate trajectory for the robot. The processing circuitry determines a plurality of surrogate constraints respectively associated the plurality of surrogate time instances, the plurality of surrogate constraints requires a distance between the robot and an obstacle to satisfy a safe distance requirement at the plurality of surrogate time instances. The processing circuitry determines an adjustment from the first intermediate trajectory to a second intermediate trajectory based on the plurality of surrogate constraints. The processing circuitry further determines at least a first strict surrogate constraint for a first surrogate time instance representing a first temporal subset in the plurality of temporal subsets based on the first temporal subset, the first strict surrogate constraint ensures the safe distance requirement being satisfied at other time instances in the first temporal subset in response to the first strict surrogate constraint being satisfied at the first surrogate time instance. The processing circuitry performs a safety check of the second intermediate trajectory according to at least the first strict surrogate constraint.

In some examples, in response to a failure of the safety check according to the first strict surrogate constraint, the processing circuitry subdivides the first temporal subset into at least two intervals for replacing the first temporal subset.

In some examples, the processing circuitry selects midpoints respectively of the plurality of temporal subsets as the plurality of surrogate time instances.

According to some aspects of the disclosure, the processing circuitry forms a cost function that is an unconstrained non linear programing (NLP) according to a penalty function and the plurality of surrogate constraints, determine a search direction based on the cost function, and determine the adjustment based on the search direction and a step size.

In some examples, the cost function includes a weighed sum of a plurality of penalty function terms respectively at the plurality of surrogate time instances, the plurality of penalty function terms are weighted respectively according to the plurality of temporal subsets.

According to an aspect of the disclosure, the penalty function P satisfies $$\lim_{x \to 0} x P(x) = \infty,$$

and is twice differentiable.

In some examples, the processing circuitry reduces the step size in response to a cost difference of the first intermediate trajectory and the second intermediate trajectory failing a converge condition. In some examples, the processing circuitry reduces the step size in response to a failure of the safety check according to the first strict surrogate constraint.

In some examples, the processing circuitry determines a first plurality of spatial subsets of the robot, and determines a second plurality of spatial subsets of the obstacle. The processing circuitry determines a Lipschitz constant based on the first plurality of spatial subsets of the robot and the second plurality of spatial subsets of the obstacle. Then, the processing circuitry determines the first strict surrogate constraint based on a safe distance in the safe distance requirement and a multiplication of the Lipschitz constant and a time length of the first temporal subset.

Aspects of the disclosure also provide a non-transitory computer-readable medium storing instructions which when executed by a computer cause the computer to perform the method for generating the trajectory of the robot.

BRIEF DESCRIPTION OF THE DRAWINGS

Further features, the nature, and various advantages of the disclosed subject matter will be more apparent from the following detailed description and the accompanying drawings in which:

FIGS. 4-6 show some algorithms in some examples.

DETAILED DESCRIPTION OF EMBODIMENTS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, these concepts may be practiced without these specific details.

According to some aspects of the disclosure, trajectory generation for articulated robots requires both robustness and optimality. In some examples, the robot body needs to be bounded away from static and dynamic obstacles by a safe distance at any time instance to achieve robustness. Further, in some examples, the generated trajectory needs to have a minimal value for a cost function in order to achieve optimality. The cost function can include smoothness, energy efficacy, time optimization, and the like.

According to an aspect of the disclosure, the trajectory generation needs to deal with collision constraints of infinite time instances, thus the trajectory generation can be a semi-infinite programing (SIP) problem. The present disclosure provides techniques for optimizations of robot trajectory which can be the SIP problem under collision constraints. The techniques can be proved to be robust.

Figure 1:
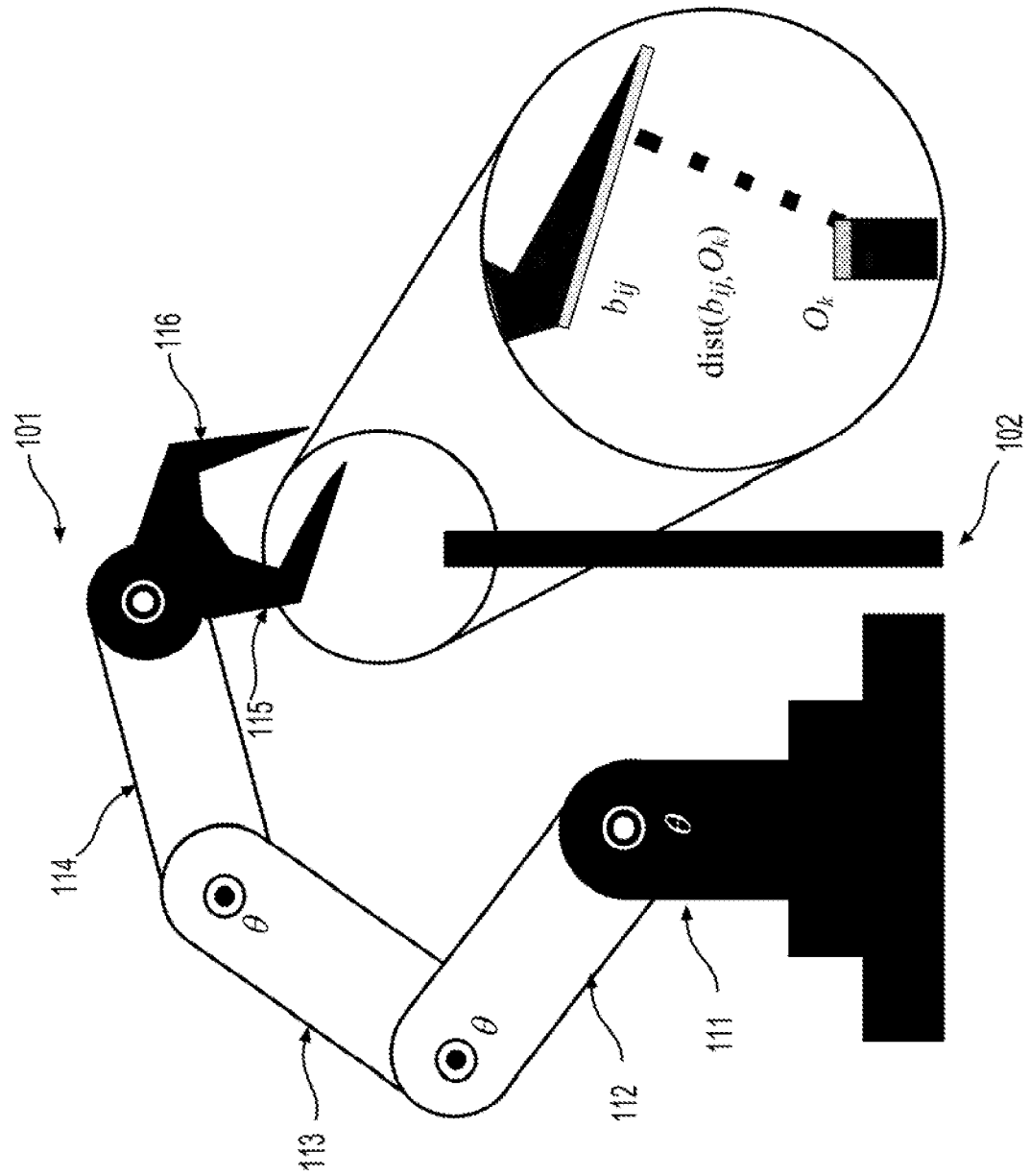
FIG. 1 shows a diagram of a robot with an obstacle in some examples.

FIG. 1 shows a diagram of a robot (101) with a set of obstacles (102) in some examples. In the FIG. 1 example, the robot (101) is shown as an open-loop articulated robot that includes a plurality of rigid bodies (also referred to as links in some examples), such as shown by (111)-(116). Each rigid body occupies a finite volume. In the FIG. 1 example, the set of obstacles (102) is shown as a set of static obstacles. It is noted that, in some examples, the set of obstacles (102) can be a set of movable obstacles, such as one or more other robots.

In the following description, an $i^{th}$ rigid body of the robot (101) is denoted by $b_i^0$ as the finite volume in its local frame ($b_i^0 \subset R^3$), and is denoted by $b_i$ as the finite volume in the global frame ($b_i \subset R^3$). The set of obstacles (102) is denoted by o that occupies finite volume in the global frame ($o \in R^3$). According to the articulated body kinematics, $b_i$ is computed from $b_i^0$ via rigid transform $b_i = M_i b_i^0$), where $M_i$ defines the rigid transform. In some examples, t denotes time and $t \in [0, T]$, $\theta$ denotes a trajectory that can include a set of decision variables, $M_i$ is a function of time and trajectory and is denoted by $M_i(t, \theta)$, and thus $b_i$ is also a function of time and trajectory, and is denoted by $b_i(t, \theta)$. In some examples, collision constrained trajectory generation can be performed as minimizing a twice differentiable cost function $\mathcal{O}(b_i)$, such that each rigid body $b_i$ is bounded away from the set of obstacles o by a safe distance denoted by $d_0$ at any $t \in [0, T]$, such as expressed by Eq. (1) in a formal form:

$$\operatorname{argmin}_\theta \mathcal{O}(b_i(t, \theta)) \qquad \text{Eq. (1)}$$
$$\text{s.t.}$$
$$\operatorname{dist}(b_i(t, \theta), o) \geq d_0$$
$$\forall i \wedge t \in [0, T],$$

where dist(·) denotes the shortest Euclidean distance between two sets. The safe distance $d_0$ can be a user specified safe distance. The cost function $\mathcal{O}(b_i)$ can encode various requirements (e.g., user requirements) for a trajectory, such as closedness between an end-effector and a target position, or a smoothness of motion. The problem expressed by Eq. (1) is a SIP due to the infinite number of constraints, each corresponding to a time instance. Also, Eq. (1) is a general definition, and the SIP by Eq. (1) is non-smooth as the distance function between two general sets is non differentiable.

According to an aspect of the disclosure, spatial discretization is used to convert non-smooth SIP to smooth SIP.

In some examples, each rigid body $b_i$ can be spatially discretized into a finite number of spatial subsets, thus $b_i = \cup_j b_{ij}$, where $b_{ij}$ denotes the $j^{th}$ spatial subset of rigid body $b_i$ in the global frame. Similarly, the set of obstacles (102) denoted by o can be decomposed into a finite number of spatial subsets, thus $o = \cup_k o_k$, where $o_k$ denotes the $k^{th}$ spatial subset of the set of obstacles (102).

In some examples, spatial discretization is performed based on point cloud, thus each $b_{ij}$ or $o_k$ is a point. It is noted that pointwise distance is differentiable.

In some examples, spatial discretization is performed based on triangle mesh. The distance between a pair of triangles can be converted to a first type of distance and a second type of distance. The first type of distance is the distance between a point and a triangle, the second type of distance is a distance between two pair of edges. It is noted that the first type of distance and the second type of distance are both twice differentiable after a regularization.

It is noted that, in some examples, other suitable spatial discretization that converts the non-smooth SIP to smooth SIP can be used.

In some examples, using suitable spatial discretization, each rigid body $b_i$ is spatial discretized into a finite number of spatial subsets that can be represented by $b_i = \cup_j b_{ij}$, and the set of obstacles (102) is spatial discretized into a finite number of spatial subsets that can be represented by $o = \cup_k o_k$, such that dist ($b_{ij}$, $o_k$) is sufficiently smooth for any ⟨ i, j, k⟩ . When the dist ($b_{ij}$, $o_k$) between a pair of spatial subsets is differentiable, then the non-smooth SIP in Eq. (1) can be converted to smooth SIP expressed by Eq. (2):

$$\operatorname{argmin}_\theta \mathcal{O}(b_i(t, \theta)) \qquad \text{Eq. (2)}$$
$$\text{s.t.}$$
$$\operatorname{dist}(b_{ij}(t, \theta), o_k) \geq d_0$$
$$\forall i, j, k \wedge t \in [0, T].$$

Some aspects of the disclosure further provide techniques to solve the smooth SIP with guaranteed robustness. In some examples, a time duration of a trajectory for a robot can be divided into intervals and conservative motion bounds are respectively determined for the intervals to ensure the collision-free property during each interval. Further, penalty functions (also referred to as barrier penalty functions) are formed for the intervals, and the penalty functions can guide optimizations to stay inside the feasible domain and approach an optimal solution of the smooth SIP. In some examples, a user-specified precision can be used by the optimizations to approach the optimal solution.

In some examples, the techniques include first techniques for determining a motion bound that conservatively estimates a range of motion of a point on the robot over a finite time interval, second techniques of a safe line-search algorithm that prevents the intersection between the motion bound and obstacles and third techniques of a motion subdivision scheme that recursively reduces the error of conservative motion estimation. According to an aspect of the disclosure, a solver (e.g., in software instructions) that is implemented using the first techniques, the second techniques and the third techniques can solve the smooth SIP problem with convergence within a finite number of iterations. In some examples, the solver is implemented by a single desktop computer, and the desktop computer can generate trajectories for some applications in a couple of minutes. In an example, the solver is used to determine a trajectory of an industrial robot arm reaching a target pose in an environment with obstacles. In another example, the solver is used to generate trajectories of multiple unmanned aerial vehicles (UAVs) to reach a set of designated goal positions. The multiple UAVs are able to perform rotation and translation simultaneously, and may interact with each other in some examples.

According to an aspect of the disclosure, the solver divides the temporal field (a time duration for a trajectory) into temporal subsets (also referred to as time intervals in some examples), and chooses a surrogate time instance for each temporal subset, thus SIP problem is reduced to non-linear programing (NLP) problem. Further, the solver determines a strict surrogate constraint for each temporal subset such that the feasible domain according to the strict surrogate constraints is a strict subset of a true feasible domain of the original problem. In some examples, the solver solves the NLP problem using a feasible interior point method to generate iterations satisfying all the strict surrogate constraints. According to an aspect of the disclosure, the solver also performs subdivisions of the temporal subsets to adaptively adjust the temporal subsets in order to approach the true feasible domain of the original problem. In some examples, the solver is referred to as subdivision-based SIP solver.

In some examples, the solver performs spatial and temporal discretization to generate spatial-temporal subsets, and each spatial-temporal subset can have infinite spatial-temporal subset of constraints due to the infinite time instances in the temporal subset. The infinite spatial-temporal subset of constraints can be expressed by Eq. (3):

$$dist(b_{ij}(t, \theta), o_k) \geq d_0 \quad \text{Eq. (3)}$$

$$\forall t \in [T_0, T_1] \subseteq [0, T]$$

where $b_{ij}$ denotes a spatial subset of the robot, $o_k$ denotes a spatial subset of the obstacle, $[T_0, T_1]$ denotes a temporal subset.

Further, a surrogate constraint is used to replace the time interval $[T_0, T_1]$ with a single time instance. In an example, a midpoint constraint is used as the surrogate constraint, such as shown by Eq. (4):

$$dist\left(b_{ij}\left(\frac{T_0 + T_1}{2}, \theta\right), o_k\right) \geq d_0 \quad \text{Eq. (4)}$$

It is noted that other suitable time instance constraint can be used as the surrogate constraint.

It is noted that the domain specified by Eq. (4) is larger than the domain specified by Eq. (3), which is a violation for feasibility requirement. In some examples, the violation is remedied by upper bounding the feasibility error due to the use of the surrogate constraint. In an example, a linear upper bound is established based on two assumptions. The first assumption assumes that dist ($b_{ij}$, $o_k$) is sufficiently smooth for any $\langle i, j, k \rangle$, and the second assumption assumes that the feasible domain of t and θ is bounded. Based on the first assumption and the second assumption, it can be proved that there exists a constant $L_1$, such that the inequality in Eq. (5) is true:

$$|dist(b_{ij}(t_1, \theta), o_k) - dist(b_{ij}(t_2, \theta), o_k)| \leq L_1|t_1 - t_2| \quad \text{Eq. (5)}$$

where $t_1$ and $t_2$ are any two time instances in the $[T_0, T_1]$. In some examples, the constant $L_1$ is Lipschitz constant.

According to Eq. (5), in some examples, the feasibility error of the midpoint surrogate constraint can be upper bounded by $L_1(T_1-T_0)/2$. In some examples, a feasible domain specified by a strict surrogate constraint (also referred to as conservative surrogate constraint) in Eq. (6) is a subset of the true feasible domain:

$$dist(b_{ij}(t, \theta), o_k) \geq d_0 + L_1|T_1 - T_0|/2. \quad \text{Eq. (6)}$$

According to an aspect of the disclosure, Eq. (5) and Eq. (6) can be used in a safety check. In some examples, the solver includes an optimizer that performs optimization according to the surrogate constraints in Eq. (4) to determine a trajectory, and the solver uses strict surrogate constraints shown by Eq. (6) to perform safety check to determine whether the trajectory is safe. It is noted that the feasible domain according to the surrogate constraints in Eq. (4) can be larger than the true feasible domain, and using the strict surrogate constraints in Eq. (6) as a safety check can make sure that the trajectory is feasible. It is noted that other suitable upper bounds that converge can be used in a similar manner as the strict surrogate constraints in Eq. (6).

According to an aspect of the disclosure, the solver can use a feasible interior point method to solve NLP. In some examples, the solver can turn each inequality of a collision constraint into a penalty function, such as shown in Eq. (7):

$$P_{ijk} \triangleq P(dist(b_{ij}(t, \theta), o_k) - d_0) \quad \text{Eq. (7)}$$

where P is a smooth monotonically decreasing penalty function defined on (0, ∞), such that $$\lim_{x \to 0} P(x) = \infty \text{ and } \lim_{x \to \infty} P(x) = 0.$$

Further, in some examples, in order to sandle SIP problem, the penalty function is designed to satisfy $$\lim_{x \to 0} xP(x) = \infty.$$

In an example, Eq. (8) is a valid penalty function. In another example, Eq. (9) is a valid penalty function.

$$P(x) = -\log(x)/x \quad \text{Eq. (8)}$$

$$P(x) = \begin{cases} \frac{(x_0 - x)^3}{x^4} & x \leq x_0 \\ 0 & x > x_0 \end{cases} \quad \text{Eq. (9)}$$

Figure 2:
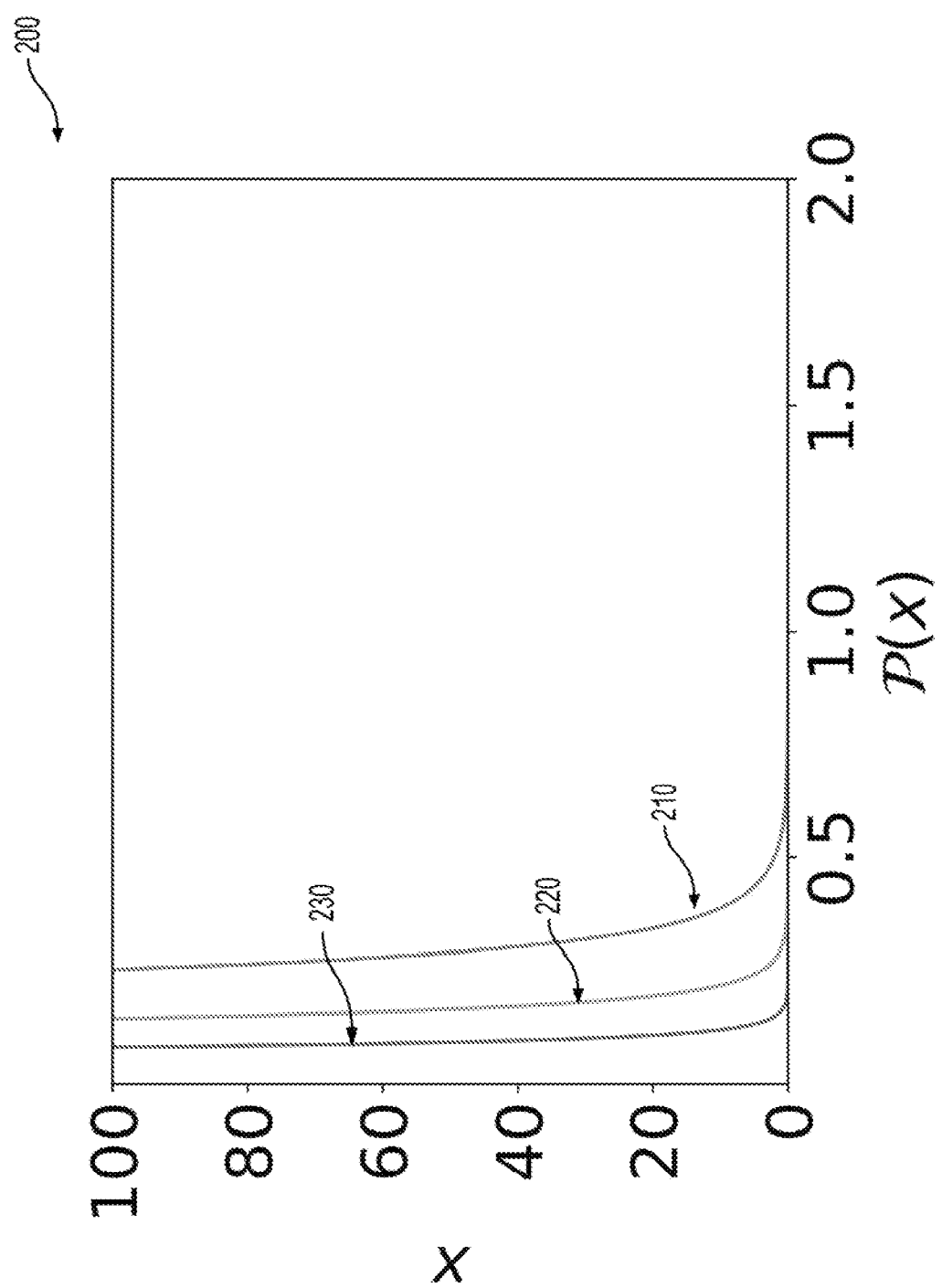
FIG. 2 shows a diagram of a penalty function.

FIG. 2 shows a diagram (200) of the penalty function in Eq. (9). The diagram (200) includes a first curve (210) corresponding to $x_0$ being 1, a second curve (220) corresponding to $x_0$ being 0.5, and a third curve (230) corresponding to $x_0$ being 0.25. It is noted that the penalty function in Eq. (9) is twice differentiable and locally supported within $(0, x_0)$ with $x_0$ being a small positive constant. In some experiment, $$x_0 = 10^{-3}$$

is used in the barrier penalty function in Eq. (9).

According to an aspect of disclosure, the infinite number of constraints can be transformed into a finite form by integrating the penalty function over infinite variable, such as represented by Eq. (10):

$$\bar{P}_{ijk}(T_0, T_1, \theta) \triangleq \int_{T_0}^{T_1} P_{ijkl}(t)dt \quad \text{Eq. (10)}$$

According to some aspects of the disclosure, the temporal domain is discretized into a disjoint set of temporal subsets, such as represented by $[0, T]=U_l[T_0^l, T_1^l]$. For each temporal subset, a midpoint constraint is used as a surrogate constraint of the temporal subset. Using a suitable penalty function, the inequality-constrained NLP can be transformed into an unconstrained NLP, such as shown by Eq. (11):

$$\operatorname{argmin}_\theta \varepsilon(\theta) \triangleq \mathcal{C}(\theta) + \mu \sum_{ijkl} (T_0^l - T_1^l) P_{ijkl}(\theta) \quad \text{Eq. (11)}$$

$$P_{ijkl}(\theta) \triangleq P_{ijkl}\left(\frac{T_0^l + T_1^l}{2}, \theta\right)$$

where $\mu$ denotes a positive weight, such as a positive weight controlling a duality gap. It is noted that in Eq. (10), the penalty function $P_{ijkl}(\theta)$ is weighted by a time span $T_1^l - T_0^l$ to approximate the integral form.

In some examples, the solver can use suitable first order and/or second order algorithms to solve Eq. (11). For example, the solver can determine the search direction of a first order according to Eq. (12), and or can determine the search direction of a second order according to Eq. (13):

$$d^{(1)} \triangleq -\nabla_\theta \mathcal{E} \quad \text{Eq. (12)}$$

$$d^{(2)} \triangleq adj(\nabla_\theta^2 \varepsilon)^{-1} d^{(1)} \quad \text{Eq. (13)}$$

where $adj(\cdot)$ is an adjustment function, such as an adjustment function for a Hessian matrix.

Further, in some examples, the solver can adaptively determine a step size $\alpha$ in a line search algorithm to satisfy a converge condition in Eq. (14):

$$\mathcal{E}(\theta + d\alpha) \leq \mathcal{E}(\theta) + c\langle d\alpha, \nabla_\theta \mathcal{E}\rangle \quad \text{Eq. (14)}$$

where $c \in (0,1)$ is a positive constant, d denotes the search direction and is set to $d^{(1)}$ when the first order search direction is used, and is set to $d^{(2)}$ when the second order search direction is used. It is noted that when a smallest positive integer z is selected such that $\alpha=1/z$ satisfies Eq. (14), the feasible interior point method can converge to the first order critical point of $\varepsilon$.

According to some aspects of the disclosure, the line search algorithm determines, based on a current trajectory (e.g., represented by $\theta$), the step size $\alpha$ for a next trajectory (e.g., represented by $\theta+d\alpha$), and accepts $\alpha$ when the next trajectory passes the safety check. According to an aspect of the disclosure, the failure of the safety check can due to two reasons. The first reason is that the step size $\alpha$ is too large, and the second reason is that more subdivisions are need. In some examples, when the next trajectory fails the safety check, the solver can choose to reduce the step size $\alpha$ until reaching a lower bound (denoted by $\epsilon_\alpha$) for the step size $\alpha$. Further, in some examples, the solver can determine at least one strict surrogate constraint is not sufficiently accurate approximation of the semi-infinite constraints for a temporal subset (e.g., represented by $[T_0^l, T_1^l]$), and the solver can perform a subdivision procedure that subdivides the temporal subset into multiple intervals, such as two intervals $[T_0^l, (T_0^l+T_1^l)/2]$ and $[(T_0^l+T_1^l)/2, T_1^l]$. The subdivision procedure can be repeated until $\alpha$ found by the line search algorithm passes the safety check.

Figure 3A:
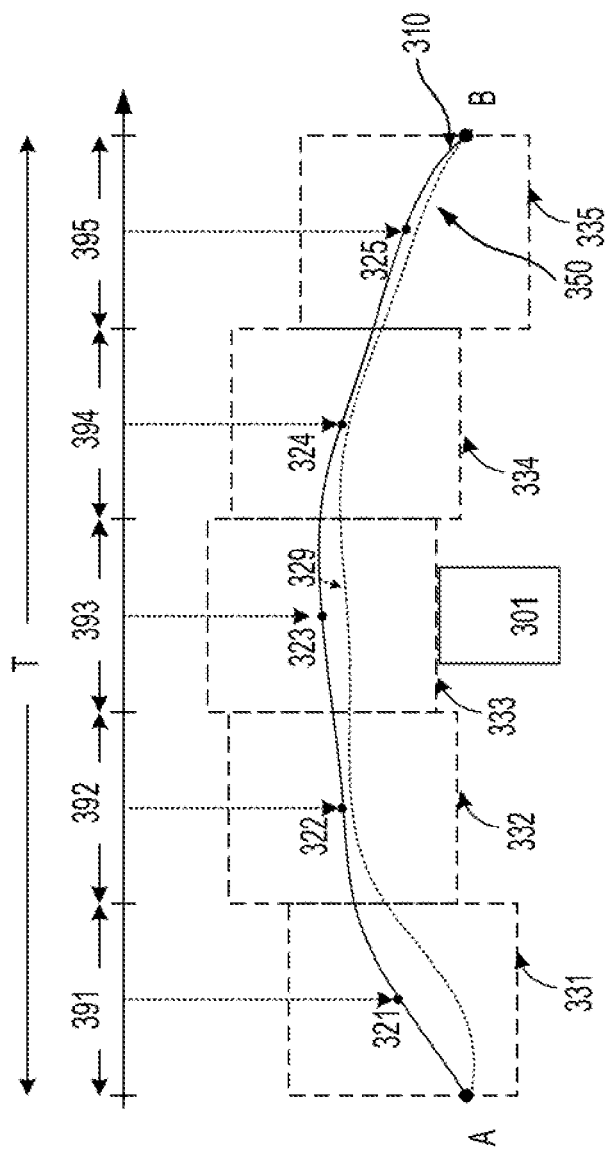
FIGS. 3A-3C show diagrams illustrating techniques in a solver according to some aspects of the disclosure.
Figure 3B:
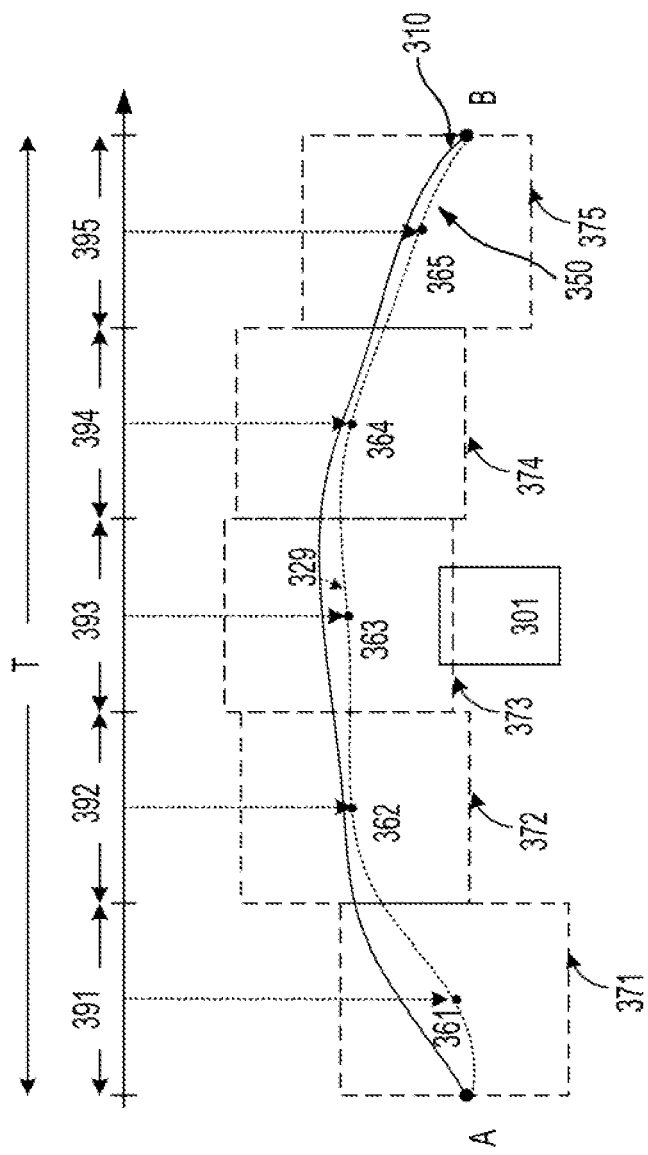
Figure 3C:
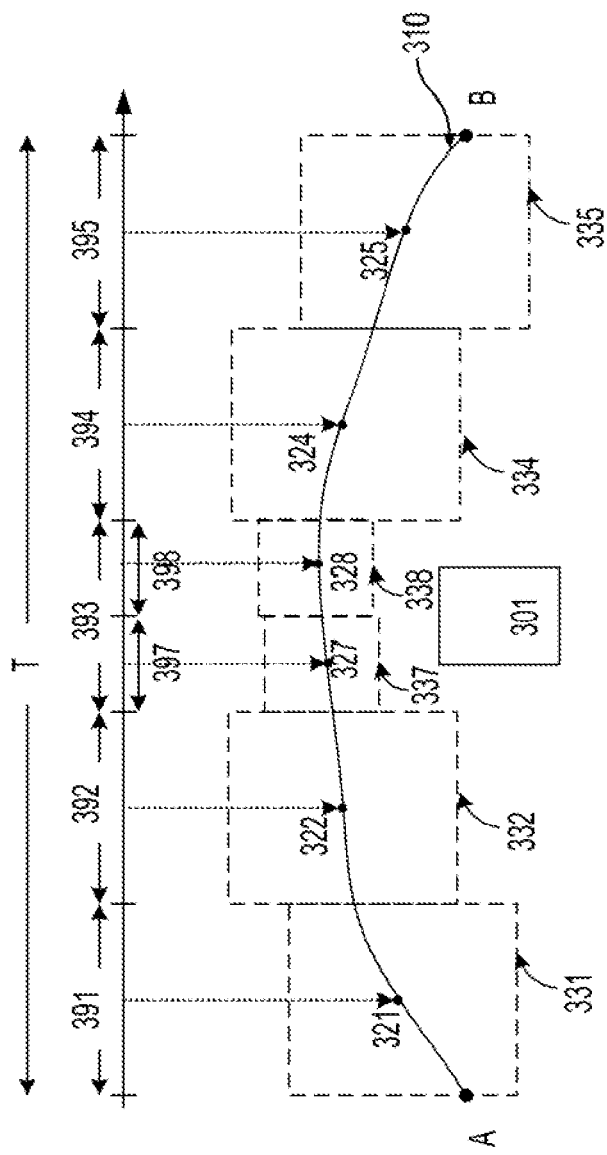

FIGS. 3A-3C show diagrams illustrating techniques used in the solver according to some aspects of the disclosure.

FIG. 3A shows a current trajectory (310) (also referred to as a first intermediate trajectory) and an obstacle (301). The current trajectory (310) corresponds to $\theta$. The current trajectory (310) can describe a moving trajectory for a point of a robot from a starting position A to a target position B in a time duration T (also referred to as temporal domain).

The temporal domain is discretized into a disjoint set of temporal subsets, such as five temporal subsets shown by (391)-(395). For each temporal subset, a midpoint constraint is used as surrogate constraint of the temporal subset. For example, a position (321) on the current trajectory (310) corresponds to the midpoint of the temporal subset (391); a position (322) on the current trajectory (310) corresponds to the midpoint of the temporal subset (392); a position (323) on the current trajectory (310) corresponds to the midpoint of the temporal subset (393); a position (324) on the current trajectory (310) corresponds to the midpoint of the temporal subset (394); and a position (325) on the current trajectory (310) corresponds to the midpoint of the temporal subset (395). Further, a set of surrogate constraints for the temporal subsets (391)-(395) are determined. For example, a surrogate constraint associated with the position (321) is used to replace the infinite number of distance constraints in the temporal subset (391); a surrogate constraint associated with the position (322) is used to replace the infinite number of distance constraints in the temporal subset (392); a surrogate constraint associated with the position (323) is used to replace the infinite number of distance constraints in the temporal subset (393); a surrogate constraint associated with the position (324) is used to replace the infinite number of the distance constraints in the temporal subset (394); a surrogate constraint associated with the position (325) is used to replace the infinite number of distance constraints (e.g., inequality constraints in Eq. (3)) in the temporal subset (395). Using the set of surrogate constraints, the SIP problem is reduced to NLP problem. Further, using a suitable penalty function, the inequality-constrained NLP can be transformed into an unconstrained NLP, for example according to the Eq. (11).

In some examples, strict surrogate constraints for the temporal subsets are determined, for example, according to Eq. (6). In FIG. 3A, the strict surrogate constraints are represented by bounding boxes associated with the positions (321)-(325), the bounding boxes are upper bounded based on the temporal subsets. In the FIG. 3A example, a bounding box (331) indicates the strict surrogate constraint associated with the position (321); a bounding box (332) indicates the strict surrogate constraint associated with the position (322); a bounding box (333) indicates the strict surrogate constraint associated with the position (323); a bounding box (334) indicates the strict surrogate constraint associated with the position (324); a bounding box (335) indicates the strict surrogate constraint associated with the position (325). In some examples, when the bounding boxes (331)-(335) do not intersect with the obstacle (301), the current trajectory (310) is feasible.

In some examples, the solver can determine the search direction d based on Eq. (11). The search direction can be the first order search direction according to Eq. (12), or can be the second order search direction according to Eq. (13). FIG. 3A shows the search direction by (329).

Further, in some examples, from the current trajectory (310), a potential next trajectory (350) can be determined based on the search direction d and a potential step size α, and the safety check is performed on the potential next trajectory (350).

FIG. 3B shows bounding boxes for the potential next trajectory (350) in some examples. For example, a position (361) on the potential next trajectory (350) corresponds to the midpoint of the temporal subset (391); a position (362) on the potential next trajectory (350) corresponds to the midpoint of the temporal subset (392); a position (363) on the potential next trajectory (350) corresponds to the midpoint of the temporal subset (393); a position (364) on the potential next trajectory (350) corresponds to the midpoint of the temporal subset (394); and a position (365) on the potential next trajectory (350) corresponds to the midpoint of the temporal subset (395). Further in the FIG. 3B example, a bounding box (371) indicates the strict surrogate constraint associated with the position (361); a bounding box (372) indicates the strict surrogate constraint associated with the position (362); a bounding box (373) indicates the strict surrogate constraint associated with the position (363); a bounding box (374) indicates the strict surrogate constraint associated with the position (364); a bounding box (375) indicates the strict surrogate constraint associated with the position (365). It is shown that the bounding box (373) intersects with the obstacle (301), the potential next trajectory (350) is not feasible, and the potential next trajectory (350) fails the safety check.

In some examples, the potential step size α can be reduced to generate an updated potential step size. Then, an updated potential next trajectory corresponding to the updated potential step size is generated, and the safety check can be performed on the updated potential next trajectory. The potential step size can be repetitively reduced until the safety check is successful or the lower bound of the potential step size is reached. When the safety check is successful, the potential next trajectory becomes the current trajectory.

In some examples, when the lower bound of the potential step size is reached, subdivisions can be performed. For example, the strict surrogate constraint for the temporal subset (393) is not sufficiently accurate approximation of the semi-infinite constraints for the temporal subset (393), and the temporal subset (393) is subdivided into multiple intervals.

FIG. 3C shows an example of subdivision in some examples. As shown in FIG. 3C, the temporal subset (393) is subdivided into smaller temporal subsets, such as a first interval (397) and a second interval (398), to replace the temporal subset (393). Further, surrogate constraints and strict surrogate constraints for the first interval (397) and the second interval (398) are determined. A position (327) on the current trajectory (310) corresponds to the midpoint of the first interval (397); a position (328) on the current trajectory (310) corresponds to the midpoint of the second interval (398). Further, a first surrogate constraint associated with the position (327) is used to replace the infinite number of distance constraints in the first interval (397); a second surrogate constraint associated with the position (328) is used to replace the infinite number of distance constraints in the second interval (398). Then, the set of surrogate constraints is updated to remove the surrogate constraint for the temporal subset (393) and to add the first surrogate constraint for the first interval (397) and the second surrogate constraint for the second interval (398). Thus, the SIP problem is reduced to an updated NLP problem. Further, using the suitable penalty function, the inequality-constrained NLP can be transformed into an unconstrained NLP, for example according to the Eq. (11).

Further, in some examples, strict surrogate constraints are determined. In FIG. 3C, the strict surrogate constraints are presented by bounding boxes. In the FIG. 3C example, a bounding box (337) indicates the strict surrogate constraint associated with the position (327); a bounding box (338) indicates the strict surrogate constraint associated with the position (328). The bounding boxes (337) and (338) in FIG. 3C replace the bounding box (333) in FIG. 3A. It is noted that the bounding boxes (337) and (338) are less strict than the bounding box (333) in FIG. 3A.

Figure 4:
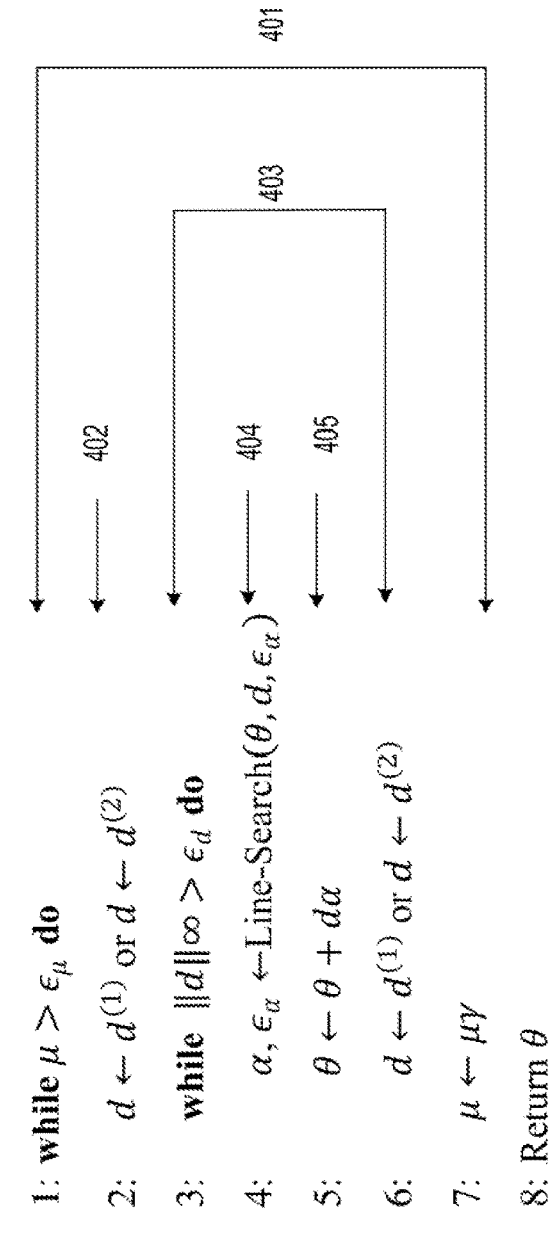

FIGS. 4-6 show algorithms for implementing the solver in some examples.

FIG. 4 shows a first algorithm (400) of feasible interior point method for solving NLP. FIG. 5 shows a second algorithm (500) for safety check. FIG. 6 shows a third algorithm (600) for a line search procedure.

The first algorithm (400) receives an initial feasible trajectory (denoted by θ), and other parameters, such as an initial weight μ, a lower bound $\epsilon_\alpha$ for the step size, a lower bound $\epsilon_d$ for the search direction, a lower bound $\epsilon_\mu$ for the weight, and a scaling factor γ∈(0,1).

The first algorithm (400) includes an inner loop (403) that repetitively calls the third algorithm (shown by (404) in FIG. 4) that is the line search algorithm (denoted by Line-Search) to determine the step size α for a next trajectory based on the current trajectory, and update the current trajectory to be the next trajectory (shown by (405) in FIG. 4) in order to approaching a local optimal trajectory. The inner loop (403) terminates when $|d|_\infty \le \epsilon_d$. The first algorithm (400) also includes an outer loop (401) that iteratively reducing the weight u based on the scaling factor γ until $\mu \le \epsilon_\mu$. The first algorithm (400) can use the first order search direction or the second order search direction as shown by (402).

The second algorithm (500) checks whether a trajectory (e.g., represented by θ) is feasible. In FIG. 5, the second algorithm (500) checks the trajectory for every combination of ⟨ i, j, k, ℓ ⟩ according to the strict surrogate constraint (e.g., Eq. (6)) as shown by (510) in FIG. 5. When the strict surrogate constraint is satisfied by the trajectory for every combination of ⟨ i, j, k, ℓ ⟩, the safety check is passed by the trajectory (e.g., return none). When the strict surrogate constraint is not satisfied by the trajectory for a combination of ⟨ i, j, k, ℓ ⟩, the safety check fails, the combination of ⟨ i, j, k, ℓ ⟩ is returned.

The third algorithm (600) performs a line search based on a current trajectory to determine the step size α for a next trajectory that approaches the local optimal. The third algorithm (600) repetitively performs a loop procedure (610) until the step size α found by the loop procedure (610) passes the safety check (e.g., the second algorithm returns none).

In the FIG. 6 example, during the loop procedure (610), in response to a failure of the safety check and the step size is higher than the lower bound, the step size α is reduced by the scaling factor γ, as shown by (615). The step size can be repetitively reduced until the safety check is successful or the lower bound of the step size is reached. When the safety check is successful, the step size is output for indicating the next trajectory.

It is noted that in the FIG. 6 example, when a converge condition (e.g., Eq. (14)) is not satisfied, the step size is also reduced, as shown by (617).

In the FIG. 6 example, when the lower bound of the step size is reached (shown by (611)), subdivision is performed as shown by (613). It is noted that any suitable subdivision technique can be used. In an example, a subdivision divides a temporal subset into two intervals of equal length. After the subdivision, the unconstrained NLP according to Eq. (11) is re-formed and reevaluated, for example to update the search direction, as shown by (614).

According to an aspect of the disclosure, it can be proved that each trajectory generated by an iteration of the first algorithm is a feasible solution to Eq. (1). According to another aspect of the disclosure, it can be proved that the first algorithm terminates after a finite number of subdivisions. According to another aspect of the disclosure, it can be proved that when the first algorithm is performed for infinite number of iterations using null sequences $\{u^k\}$ and $\{\epsilon_d^k\}$, where k is the iteration number, then a solution sequence $\{\theta^k\}$ is obtained such that every accumulation point $\theta^0$ satisfies the first order optimality condition of Eq. (1).

Some aspects of the disclosure also provide techniques for determining the Lipschitz constant $L_1$. In some examples, the Lipschitz constant $L_1$ are evaluated for a first case of two edges in an edge pair, and a second case of a vertex and a triangle. In the following description, $L_1^{ij}$ denotes the Lipschitz constant of $b_{ij}$ satisfying Eq. (6). In an example, $b_{ij}$ is considered to be a moving point, the first case and the second case can be modification of this example. According to an aspect of the disclosure, the Lipschitz constant can be calculated by the chain rule, for example according to Eq. (15):

$$L_1^{ij} = \max\left|\frac{\partial dist(b_{ij}(t, 0), o_k)}{\partial t}\right| \quad \text{Eq. (15)}$$

$$= \max\left|\frac{\partial dist(b_{ij}t, 0), o_k)}{\partial b_{ij}(t, 0)} \frac{\partial b_{ij}(t, 0)}{\partial \Theta(t, 0)} \frac{\partial \Theta(t, 0)}{\partial t}\right|$$

where $\ominus$ denotes the vector of joint parameters, which is also a function of t and θ.

Without a loss of generality, each entry of $$\frac{\partial \Theta(t, 0)}{\partial t}$$

is limited to the range of [−1, 1]. The first term in Eq. (15) is a distance function, whose sub-gradient has a norm at most 1. Thus, from Eq. (15), Eq. (16) can be obtained:

$$L_1^{ij} \le \max\left|\frac{\partial b_{ij}(t, 0)}{\partial \Theta(t, 0)}\right|_{2,1} \quad \text{Eq. (16)}$$

which means $L_1^{ij}$ can be upper bound of 2, 1-norm of the Jacobian matrix.

In some examples, in the case that $b_{ij}$ is a triangle with three vertices denoted as $b_{ij}^1$, $b_{ij}^2$, and $b_{ij}^3$, a closest point on $b_{ij}$ to $o_k$ lies on an interpolated point $b_{ij}^1 \xi^1$, $b_{ij}^2 \xi^2$, and $b_{ij}^3 \xi^3$, where $\xi^1$, $\xi^2$, and $\xi^3$ are interpolation weights that are also function of θ(t). In some examples, Eq. (17) holds for every point:

$$\left|\frac{\partial dist(b_{ij}(t, 0), o_k)}{\partial t}\right| \le \left|\frac{\partial dist(b_{ij}^1 \xi^1 + b_{ij}^2 \xi^2 + b_{ij}^3 \xi^3, o_k)}{\partial t}\right| \quad \text{Eq. (17)}$$

Based on Eq. (17), and $\xi^1$, $\xi^2$, and $\xi^3$ form a convex combination, the Eq. (18) can be obtained:

$$L_1^{ij} = \max\left|\frac{\partial dist(b_{ij}(t, \theta), o_k)}{\partial t}\right| \quad \text{Eq. (18)}$$

$$\le \max\left|\frac{\partial dist(b_{ij}(t, \theta), o_k)}{\partial b_{ij}^1 \xi^1 +} \frac{\partial b_{ij}^1 \xi^1 +}{\partial \Theta(t, \theta)} \frac{\partial \Theta(t, \theta)}{\partial t}\right|$$

$$\le \max \sum_{m=1}^{3} \left|\frac{\partial b_{ij(t,\theta)}^m}{\partial \Theta(t, \theta)}\right|_{2,1} \xi^m \le \max_{m=1,\ldots,3} \left|\frac{\partial b_{ij(t,\theta)}^m}{\partial \Theta(t, \theta)}\right|_{2,1}$$

In other words, the Lipschitz constant of a moving triangle is the maximal Lipschitz constant over its three vertices. It is noted that similar result can be obtained for the case that $b_{ij}$ is a moving edge.

Figure 7:
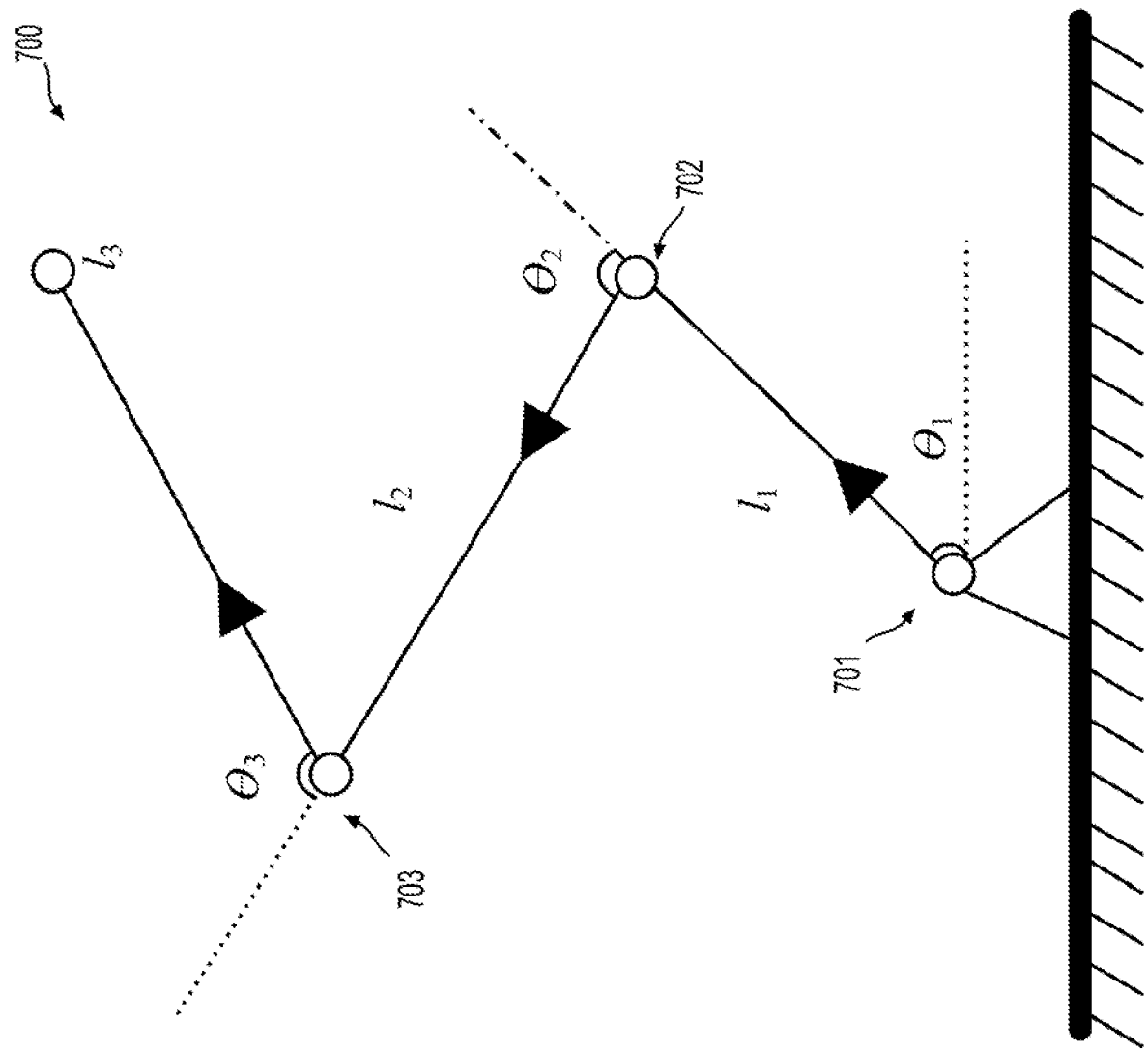
FIG. 7 shows a diagram illustrating a robot arm with hinge joints in some examples.

Further, upper bound of the 2, 1-norm of the Jacobian matrix for a moving point $b_{ij}$ can be evaluated. The upper bound can be derived from the forward kinematic function. FIG. 7 shows a diagram (700) illustrating a robot arm with hinge joints (701), (702) and (703). When the moving point $b_{ij}$ lies on the Kth link, then the position of $b_{ij}$ is affected by $\ominus_1, \ldots, \ominus_K$. In FIG. 7, the kth link has a length of $l_k$. The maximal influence of $\ominus_k$ on $b_{ij}$ happens when all the k, . . . Kth links are straight. Thus, Eq. (19) can be obtained:

$$\left|\frac{\partial b_{ij}}{\partial \Theta_k}\right| \le \sum_{m=1}^{k} l_m \Rightarrow \left|\frac{\partial b_{ij}}{\partial \Theta}\right|_{2,1} \le \sum_{k=1}^{K} \sum_{m=k}^{K} l_m \quad \text{Eq. (19)}$$

According to an aspect of the disclosure, $L_1^{ij}$ formulation relies on the boundedness of $$\frac{\partial \Theta(t, \theta)}{\partial t}.$$

In some examples, an articulated robot can have joint limits that may need to be satisfied at any $t \in [0,T]$. In some examples, high-order composite Bezier curves are used to parameterize the trajectory $\ominus(t,\theta)$ in the configuration space, so that $\ominus(t,\theta)$ is a high order polynomial function. Then, bounds on $\ominus(t,\theta)$ at an arbitrary t can be transformed into bounds on control points. $\overline{\ominus}$ denotes the upper joint limit, and $\underline{\ominus}$ denotes the lower joint limit, $M_k$ denotes the matrix extracting the control points of $\Theta_k$ and $M_{ik}$ denotes the $i^{th}$ row of $M_k$, then the joint limit constraints can be conservatively enforced a log-barrier function, such as shown in Eq. (20):

$$\sum_i \sum_k P(\overline{\Theta}_k - M_{ik}\Theta_k) + P(-\underline{\Theta}_k + M_{ik}\Theta_k) \qquad \text{Eq. (20)}$$

In some examples, similar approach is used to bound $$\frac{\partial \Theta_k(t, \theta)}{\partial t}$$

to the range $[-1, 1]$. It is noted that the gradient of a Bezier curve is another Bezier curve with a lower order. $M'_k$ denotes the matrix extracting the control points of $$\frac{\partial \Theta_k(t, \theta)}{\partial t},$$

and $M'_k$ denotes the $i^{th}$ row of $M'_k$. The boundedness of $$\frac{\partial \Theta(t, \theta)}{\partial t}$$

for any t can be realized by adding the log barrier function shown in Eq. (21):

$$\sum_i \sum_k P(1 - M'_{ik}\Theta_k) + P(1 + M_{ik}\Theta_k) \qquad \text{Eq. (21)}$$

It is noted that the constraints in Eq. (20) and Eq. (21) are strictly conservative. Further, more control points in the Bezier curve composition can allow an arbitrarily long trajectory of complex motions.

In some examples, the solver is implemented on a single desktop computer with multiple CPU cores. The multiple CPU cores can parallelize various computations, such as collision check, energy function computation, derivative computations. In an example, the solver is used to determine a trajectory of an industrial robot arm reaching a target pose through an environment with obstacles, the solver converges after finite number of subdivisions and iterations with about 10 minutes computation. In another example, the solver is used to generate trajectories of 6 unmanned aerial vehicles (UAVs) to reach a set of designated goal positions, the solver converges after finite number of subdivisions and iterations with about 45 minutes of computation.

Figure 8:
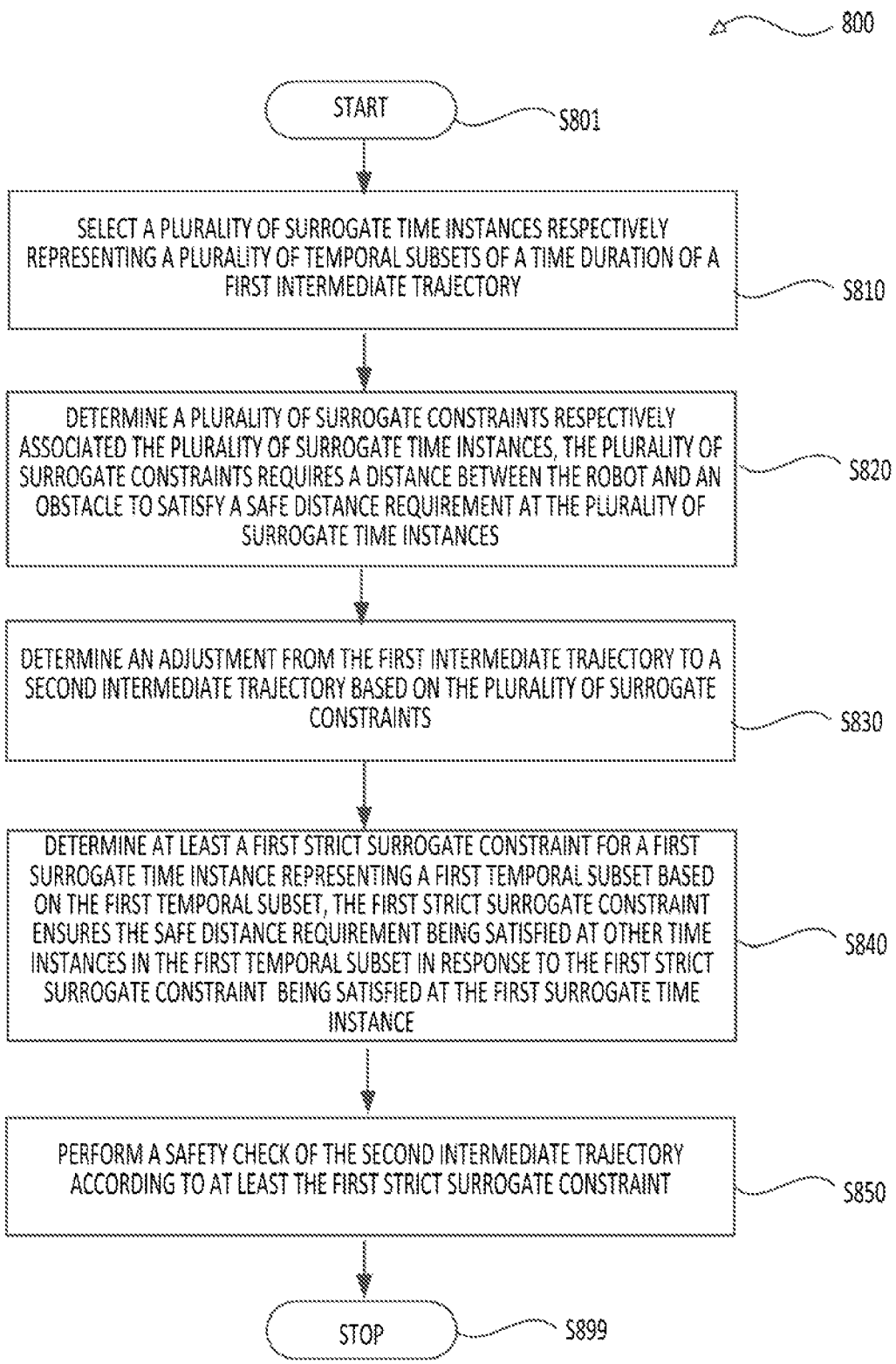
FIG. 8 shows a flow chart outlining a process according to some aspects of the disclosure.

FIG. 8 shows a flow chart outlining a process (800) according to an embodiment of the disclosure. In some embodiments, the process (800) is implemented as software instructions of algorithms in a solver, thus when processing circuitry executes the software instructions, the processing circuitry performs the process (800). The process (800) can be used for trajectory planning in various applications. In an example, the process (800) is used to generate a trajectory for an articulated robot in an environment with obstacles. In another example, the process (800) is used to design trajectories for a plurality of UAVs to reach a set of designated goal positions. In another example, the process (800) is used in trajectory planning for controlling virtual objects in virtual worlds, such as in video game. The process starts at (S801) and proceeds to (S810).

At (S810), a plurality of surrogate time instances are selected respectively representing a plurality of temporal subsets of a time duration of a first intermediate trajectory (e.g., the current trajectory (310)). In some examples, midpoints of the plurality of temporal subsets are selected as the plurality of surrogate time instances.

At (S820), a plurality of surrogate constraints respectively associated the plurality of surrogate time instances are determined. The plurality of surrogate constraints require a distance between the robot and an obstacle to satisfy a safe distance requirement at the plurality of surrogate time instances. In an example, the safe distance requirement limits a shortest distance between the robot and the obstacle to be greater than a user defined safe distance.

At (S830), an adjustment from the first intermediate trajectory to a second intermediate trajectory (e.g., the potential next trajectory (350)) is determined based on the plurality of surrogate constraints.

At (S840), at least a first strict surrogate constraint for a first surrogate time instance representing a first temporal subset in the plurality of temporal subsets is determined based on the first temporal subset. The first strict surrogate constraint ensures the safe distance requirement being satisfied at other time instances in the first temporal subset in response to the first strict surrogate constraint being satisfied at the first surrogate time instance.

At (S850), a safety check of the second intermediate trajectory is performed according to at least the first strict surrogate constraint.

In some examples, in response to a failure of the safety check according to the first strict surrogate constraint, the first temporal subset is subdivided into at least two intervals for replacing the first temporal subset. In an example, the first temporal subset is evenly subdividing the first temporal subset into the at least two intervals.

In some examples, to determine the adjustment, a cost function (e.g., Eq. (11)) that is an unconstrained non linear programing (NLP) is formed according to a penalty function and the plurality of surrogate constraints. Then, a search direction is determined based on the cost function, and the adjustment is determined based on the search direction and a step size. In an example, the cost function includes a weighed sum of a plurality of penalty terms respectively at the plurality of surrogate time instances based on the penalty function, the plurality of penalty terms are weighted respectively according to the plurality of temporal subsets. In some examples, the penalty function P satisfies $$\lim_{x \to 0} xP(x) = \infty,$$

and is twice umrerentiable. In some examples, the step size is reduced in response to a cost difference of the first intermediate trajectory and the second intermediate trajectory failing a converge condition (e.g., Eq. (14)). In some examples, the step size is reduced in response to a failure of the safety check according to the first strict surrogate constraint.

In some examples, the robot is discretized into a first plurality of spatial subsets, and the obstacle is discretized into a second plurality of spatial subsets. In some examples, a Lipschitz constant is determined based on the first plurality of spatial subsets of the robot and the second plurality of spatial subsets of the obstacle. In an example, the first strict surrogate constraint is determined based on a safe distance in the safe distance requirement and a multiplication of the Lipschitz constant and a time length of the first temporal subset, such as shown by Eq. (6).

Then, the process proceeds to (S899) and terminates.

The process (800) can be suitably adapted. Step(s) in the process (800) can be modified and/or omitted. Additional step(s) can be added. Any suitable order of implementation can be used.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
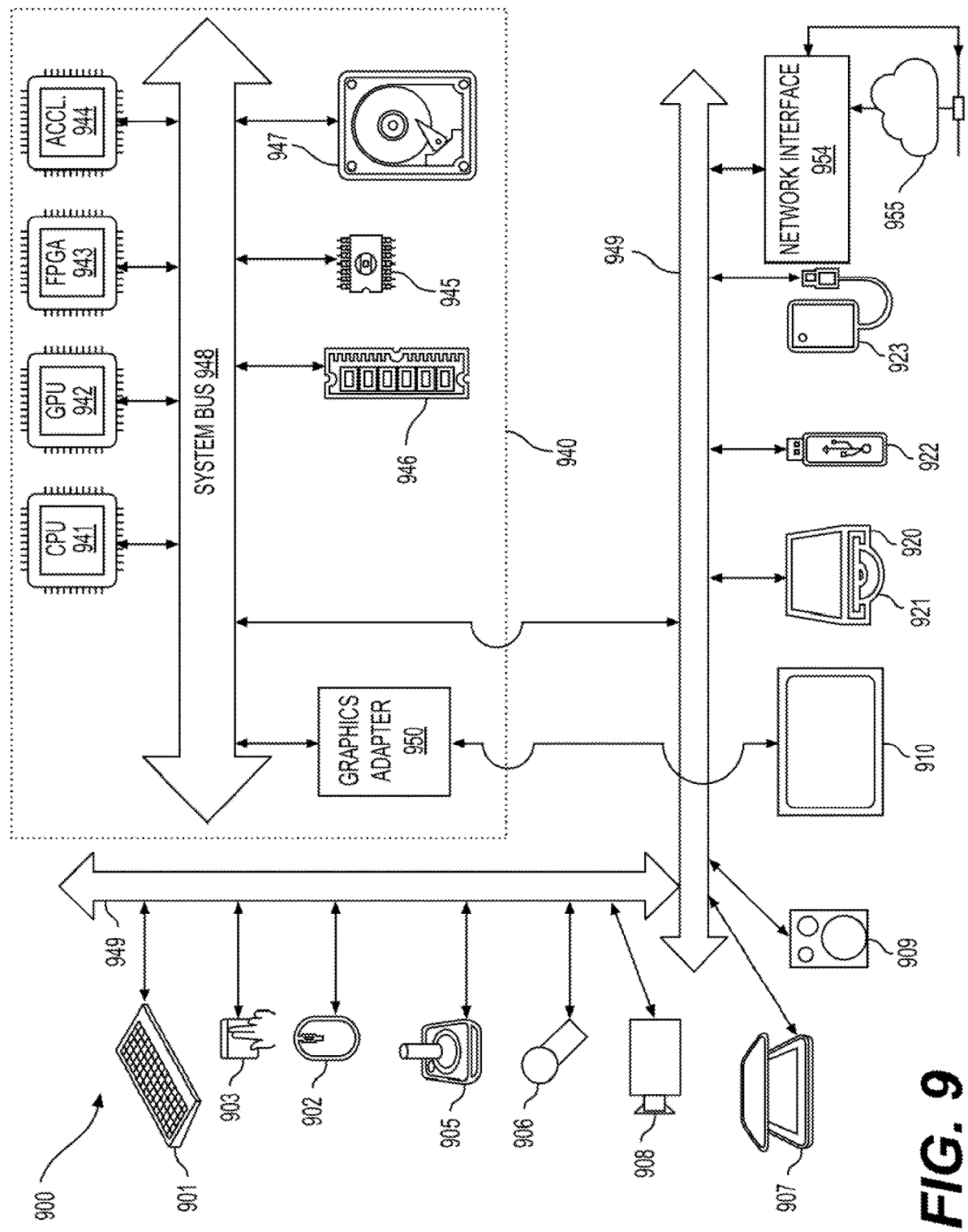
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of generating a trajectory of a robot, comprising:
    selecting, by processing circuitry, a plurality of surrogate time instances respectively representing a plurality of temporal subsets of a time duration of a first intermediate trajectory;
    determining, by the processing circuitry, a plurality of surrogate constraints respectively associated with the plurality of surrogate time instances, the plurality of surrogate constraints requiring a distance between the robot and an obstacle to satisfy a safe distance requirement at the plurality of surrogate time instances;
    determining, by the processing circuitry, an adjustment from the first intermediate trajectory to a second intermediate trajectory based on the plurality of surrogate constraints;
    forming, by the processing circuitry, a cost function that is an unconstrained non linear programing (NLP) according to a penalty function P and the plurality of surrogate constraints, the penalty function P satisfying $$\lim_{x \to 0} xP(x) = \infty,$$

and being twice differentiable;
    determining, by the processing circuitry, at least a first strict surrogate constraint for a first surrogate time instance representing a first temporal subset in the plurality of temporal subsets based on the first temporal subset, the first strict surrogate constraint ensuring the safe distance requirement being satisfied at other time instances in the first temporal subset in response to the first strict surrogate constraint being satisfied at the first surrogate time instance;
    performing, by the processing circuitry, a safety check of the second intermediate trajectory according to at least the first strict surrogate constraint; and
    controlling the robot based on a result of the safety check of the second intermediate trajectory.

2. The method of claim 1, wherein in response to the safety check according to the first strict surrogate constraint failing, the method further comprises:
    subdividing the first temporal subset into at least two intervals for replacing the first temporal subset.

3. The method of claim 1, wherein the selecting the plurality of surrogate time instances further comprises:
    selecting midpoints respectively of the plurality of temporal subsets as the plurality of surrogate time instances.

4. The method of claim 1, wherein the determining the adjustment further comprises:
    determining a search direction based on the cost function; and
    determining the adjustment based on the search direction and a step size.

5. The method of claim 4, wherein the cost function comprises:
    a weighed sum of a plurality of penalty function terms respectively at the plurality of surrogate time instances, the plurality of penalty function terms being weighted respectively according to the plurality of temporal subsets.

6. The method of claim 4, further comprising:
    reducing the step size in response to at least one of:
        a cost difference of the first intermediate trajectory and the second intermediate trajectory failing a converge condition; and
        a failure of the safety check according to the first strict surrogate constraint.

7. The method of claim 1, further comprising:
    determining a first plurality of spatial subsets of the robot; and
    determining a second plurality of spatial subsets of the obstacle.

8. The method of claim 7, further comprising:
determining a Lipschitz constant based on the first plurality of spatial subsets of the robot and the second plurality of spatial subsets of the obstacle.

9. The method of claim 8, wherein the determining at least the first strict surrogate constraint further comprises:
determining the first strict surrogate constraint based on a safe distance in the safe distance requirement and a multiplication of the Lipschitz constant and a time length of the first temporal subset.

10. An apparatus, comprising processing circuitry configured to:
select a plurality of surrogate time instances respectively representing a plurality of temporal subsets of a time duration of a first intermediate trajectory for a robot;
determine a plurality of surrogate constraints respectively associated with the plurality of surrogate time instances, the plurality of surrogate constraints requiring a distance between the robot and an obstacle to satisfy a safe distance requirement at the plurality of surrogate time instances;
form a cost function that is an unconstrained non linear programing (NLP) according to a penalty function P and the plurality of surrogate constraints, the penalty function P satisfying $$\lim/x \to 0 xp(x) = \infty$$

and being twice differentiable;
determine an adjustment from the first intermediate trajectory to a second intermediate trajectory based on the plurality of surrogate constraints;
determine at least a first strict surrogate constraint for a first surrogate time instance representing a first temporal subset in the plurality of temporal subsets based on the first temporal subset, the first strict surrogate constraint ensuring the safe distance requirement being satisfied at other time instances in the first temporal subset in response to the first strict surrogate constraint being satisfied at the first surrogate time instance;
perform a safety check of the second intermediate trajectory according to at least the first strict surrogate constraint.

11. The apparatus of claim 10, wherein the processing circuitry is configured to:
in response to a failure of the safety check according to the first strict surrogate constraint, subdivide the first temporal subset into at least two intervals for replacing the first temporal subset.

12. The apparatus of claim 10, wherein the processing circuitry is configured to:
select midpoints respectively of the plurality of temporal subsets as the plurality of surrogate time instances.

13. The apparatus of claim 10, wherein the processing circuitry is configured to:
determine a search direction based on the cost function; and
determine the adjustment based on the search direction and a step size.

14. The apparatus of claim 13, wherein the cost function comprises:
a weighed sum of a plurality of penalty function terms respectively at the plurality of surrogate time instances, the plurality of penalty function terms being weighted respectively according to the plurality of temporal subsets.

15. The apparatus of claim 13, wherein the processing circuitry is configured to:
reduce the step size in response to at least one of:
a cost difference of the first intermediate trajectory and the second intermediate trajectory failing a converge condition; or
a failure of the safety check according to the first strict surrogate constraint.

16. The apparatus of claim 10, wherein the processing circuitry is configured to:
determine a first plurality of spatial subsets of the robot; and
determine a second plurality of spatial subsets of the obstacle.

17. The apparatus of claim 16, wherein the processing circuitry is configured to:
determine a Lipschitz constant based on the first plurality of spatial subsets of the robot and the second plurality of spatial subsets of the obstacle.

18. The apparatus of claim 17, wherein the processing circuitry is configured to:
determine the first strict surrogate constraint based on a safe distance in the safe distance requirement and a multiplication of the Lipschitz constant and a time length of the first temporal subset.

* * * * *